Patented Sept. 15, 1925.

1,554,155

UNITED STATES PATENT OFFICE.

GEORGE LOUIS COUSINEAU, OF LONG BEACH, CALIFORNIA.

MEDICINAL COMPOSITION.

No Drawing. Application filed July 24, 1823, Serial No. 653,576. Renewed June 23, 1925.

*To all whom it may concern:*

Be it known that I, GEORGE LOUIS COUSINEAU, a citizen of Canada, residing at Long Beach, in the county of Los Angeles and State of California, have invented certain new and useful Improvements in Medicinal Compositions, of which the following is a specification.

The present invention relates to a new medicinal material prepared from testicular glands of animals, and the object of the invention is to prepare such a material in a form in which it will be stable and effective and in which it can be administered hypodermically.

In the preferred form of the process of producing my noval compound, I first remove the glands in question from a young animal, the animal being alive.

The glands are then minced and ground thoroughly to the form of a pulp, all of the solid particles being reduced to a substantially impalpable state. The gland material is mixed with a liquid, preferably a physiological salt solution. There is also preferably added alcohol, in order to prevent fermentation and other undesired changes, and a small amount of a phenolic body. Although the proportions can be varied substantially, I have found that 40 c. c. of the solutions should preferably contain approximately 11.56 grams of the gland substance.

To the liquid is then added 10% (by volume) of alcohol and about ½% of pure phenol (purified carbolic acid). This produces a liquid having approximately the following composition:

Physiological salt solution 1 cubic centimeter, gland substance .289 gram, alcohol (rectified ethyl) .1 cubic centimeter, phenol .005 cubic centimeter.

The liquid is then put up into ampules of different sizes, from 1 c. c. to 40 c. c., or it may be put up in syringes of from 5 c. c. to 40 c. c., or other sizes, according to desire.

The liquid made as per the above example can be introduced hypodermically, intramuscularly or subcutaneously, into the human organism, male or female, child or adult. The dose can vary considerably, depending upon the age, vitality and condition of the patient. The ampules above referred to can be used as single doses, or in some cases substantially greater doses can be given; for example, 55 c. c., 60 c. c., 80 c. c.

The animals from which the glands are taken are healthy, and it is preferable to use young animals. As examples of the animals, the following are mentioned: Monkey, goat, sheep, hog, beef, and rabbit. Age: In utero until on and beyond maturity.

Shaking of this liquid before using is advisable.

Relative to the substitution of liquids, vehicles of various types may be used for suspension of the gland; water containing boric acid, salicylic acid and any type of preservative in normal proportions may be used in the preparation of this gland in these dosages.

The number of diseases or types of diseases in which the orchitic substance is of decided value are so varied that they involve practically every type of disease known.

I claim:

1. As a new medicinal product, an aqueous liquid containing both the soluble and insoluble portions of comminuted testicular gland.

2. A new medicinal product containing comminuted testicular gland in a vehicle comprising a solution of salt of about physiological strength.

3. A new medicinal preparation comprising finely comminuted testicular gland substance, physiological salt solution, alcohol and a small amount of a phenolic body.

GEORGE LOUIS COUSINEAU, M. D.